Jan. 15, 1957 E. L. AVRA 2,777,258
SHARPENING MACHINE
Filed Sept. 1, 1953 3 Sheets-Sheet 1
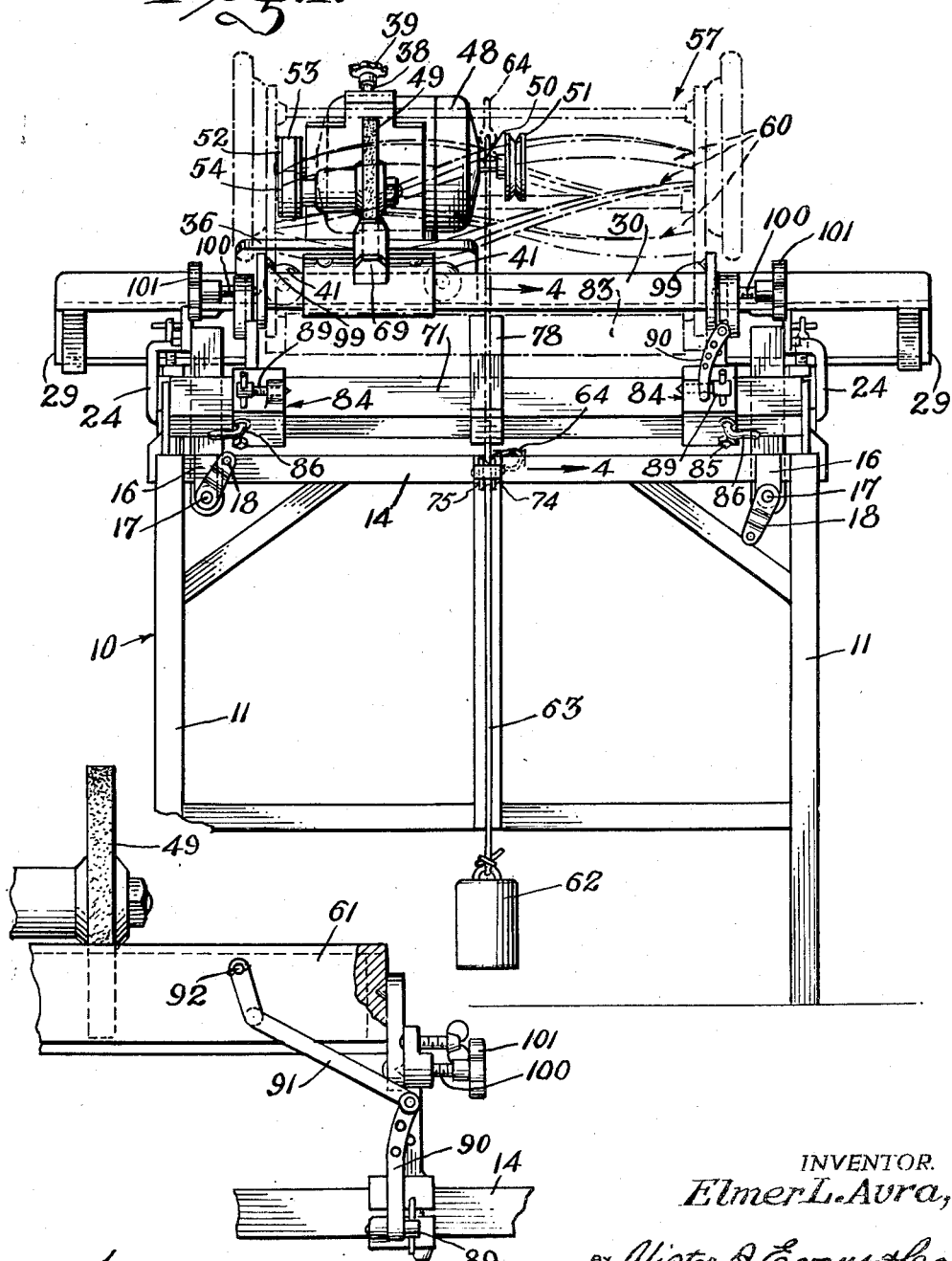
INVENTOR.
Elmer L. Avra,
BY Victor J. Evans & Co.
ATTORNEYS

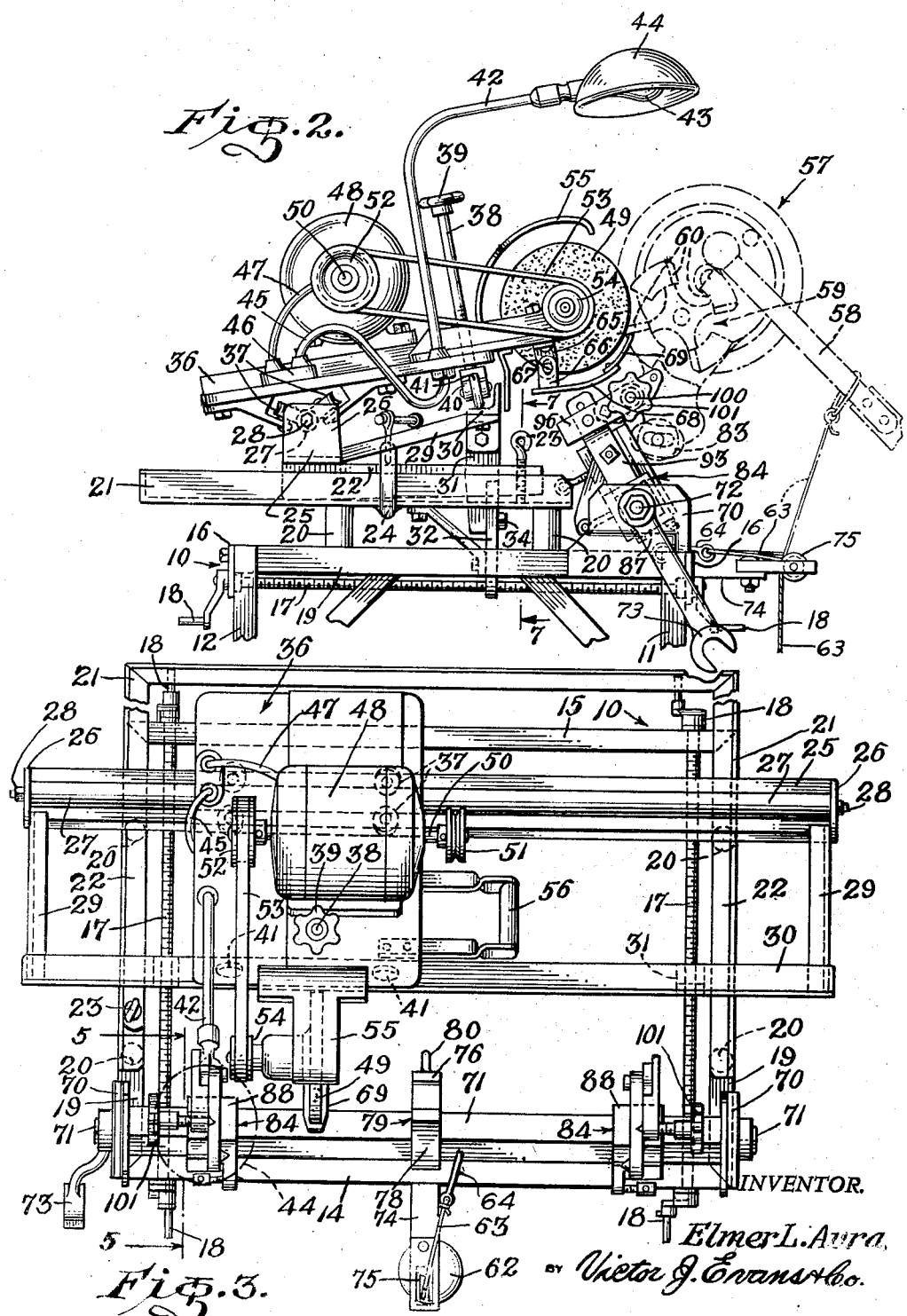

Jan. 15, 1957  E. L. AVRA  2,777,258
SHARPENING MACHINE
Filed Sept. 1, 1953  3 Sheets-Sheet 3
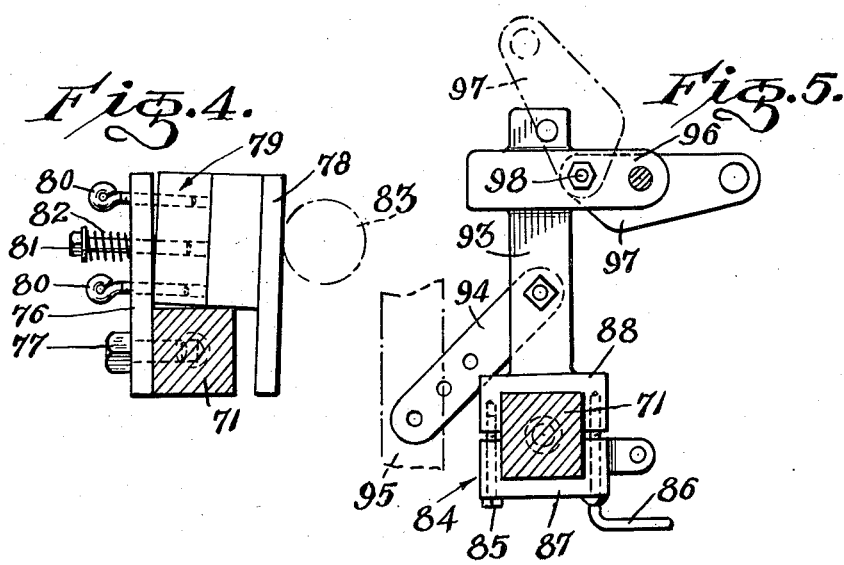
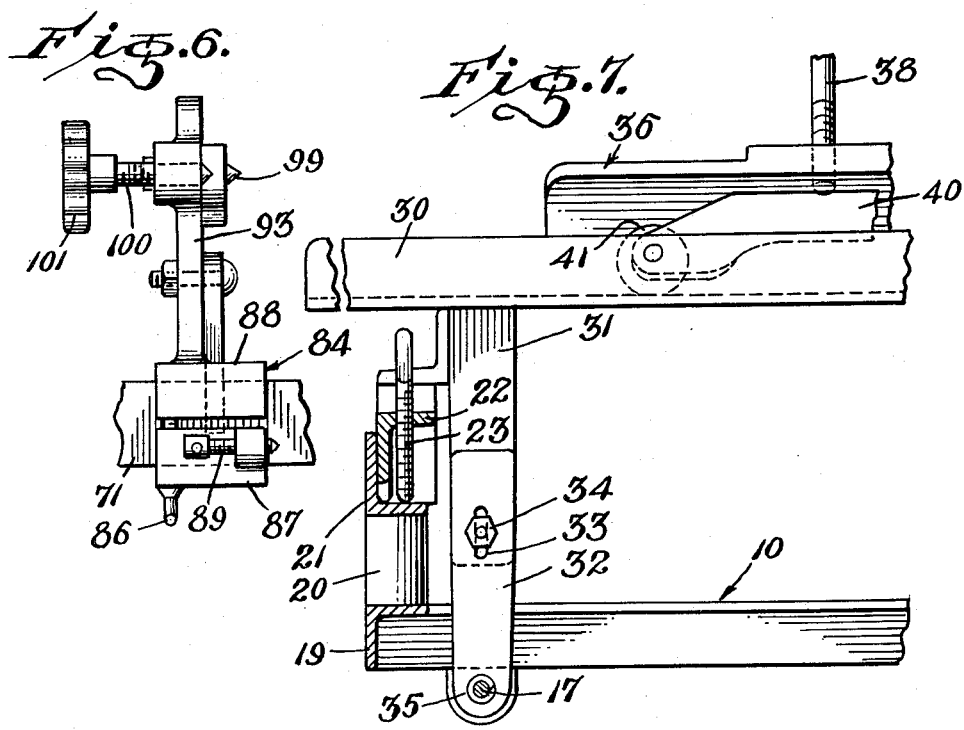
INVENTOR.
Elmer L. Avra,
BY Victor J. Evans & Co.
ATTORNEYS

United States Patent Office 2,777,258
Patented Jan. 15, 1957

2,777,258

SHARPENING MACHINE

Elmer L. Avra, Sapulpa, Okla.; Lela M. Avra, administratrix of said Elmer L. Avra, deceased, assignor of sixty percent to Lela M. Avra, Paul E. Avra, Marvin L. Avra, and Darell E. Avra, and forty percent to W. D. Ball Application September 1, 1953, Serial No. 377,846

3 Claims. (Cl. 51—48)

This invention relates to a sharpening machine, and more particularly to a machine for sharpening lawn mowers.

The object of the invention is to provide a machine which will sharpen power driven or hand driven lawn mowers with ease and rapidity and with a high degree of accuracy.

Another object of the invention is to provide a lawn mower sharpening machine which will grind or sharpen all types of lawn mowers, there being a means provided for adjusting the machine so that the correct bevel can be obtained on the various blades being sharpened.

Another object of the invention is to provide a lawn mower sharpening machine wherein the lawn mowers can be sharpened without the necessity of completely disassembling the lawn mowers, the machine being ruggedly constructed so that damage to the parts will not readily occur.

A further object of the invention is to provide a lawn mower sharpening machine which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a front elevational view of the lawn mower sharpening machine, constructed according to the present invention.

Figure 2 is a side elevational view of the lawn mower sharpening machine, showing the upper portion of the machine.

Figure 3 is a top plan view of the sharpening machine of the present invention.

Figure 4 is a sectional view taken on the line 4—4 of Figure 1.

Figure 5 is a sectional view taken on the line 5—5 of Figure 3.

Figure 6 is an elevational view showing one of the lawn mower support members.

Figure 7 is a sectional view taken on the line 7—7 of Figure 2.

Figure 8 is a fragmentary sectional view showing a lawn mower bed knife being supported adjacent the grinding wheel.

Referring in detail to the drawings, the numeral 10 designates a frame which may be made of any suitable material such as angle iron, and the frame 10 includes a pair of spaced parallel vertically disposed front legs 11, Figure 1, and a pair of spaced parallel vertically disposed rear legs 12. Extending between the pair of front legs 11 and secured thereto is a crosspiece 14, and a similar crosspiece 15 extends between the rear legs 12 and is secured thereto. A pair of spaced parallel horizontally disposed side members 19 interconnect the tops of the front and rear legs together for a purpose to be later described. Depending from the top of the frame is a plurality of lugs 16 which support a pair of horizontally disposed spaced parallel screw members 17. Cranks 18 are mounted on each end of the screw members 17 for rotating the latter whereby a carriage containing the grinding wheel and motor can be moved toward and away from the lawn mower being sharpened.

Extending upwardly from each of the side members 19 and secured thereto is a plurality of vertically disposed spaced parallel posts 20, Figure 2. Secured to the upper ends of the posts 20 is a pair of horizontally disposed angle irons 21, Figures 2 and 7. Arranged above each of the angle irons 21 is a second angle iron 22 and a threaded bolt or rod 23 extends through each of the angle irons 22 and engages the angle iron 21 therebelow. Thus, by rotating the bolts 23 the front of the angle irons 22 can be tilted or adjusted as desired. Clamps 24 serve to prevent complete disengagement of the angle irons 22 from the angle irons 21.

Extending across the pair of angle irons 22 and secured thereto is a body member 25, Figure 3, and a pair of ears 26 extend upwardly from the ends of the body member 25. A cylindrical rod 27 is secured to the pair of ears 26 by bolt and nut assemblies 28 for a purpose to be later described.

Extending forwardly from the body member 25 and secured thereto is a pair of inclined braces 29 which each have their front end secured to an L-shaped bar 30. A pair of blocks 31 depend from the bar 30 and are secured thereto, and the blocks 31 are also secured to the second pair of angle irons 22. An arm 32 provided with a slot 33 is adjustably connected to the lower end of each of the blocks 31 by a bolt and nut assembly 34. The lower end of each of the arms 32 is provided with a threaded opening 35 for receiving therein the screw member 17. Thus, upon rotation of the screw members 17 by the cranks 18, the carriage including the rod 27 and the bar 30 can be moved simultaneously toward and away from the lawn mower being sharpened. The slot 33 in the arms 32 permits up and down adjustment of the carriage without any jamming due to the screw members 17 since the bolt and nut assemblies 34 can be loosened to permit raising and lowering of the carriage.

The lawn mower sharpening machine of the present invention further includes a platform 36 which has a plurality of rear wheels or rollers 37 rotatably connected thereto for engagement with the rod 27. For supporting the front end of the platform 36 so that the platform can move along the rod 27 and bar 30, an elongated stem 38 has a threaded portion extending through the platform 36. A knob 39 is mounted on the upper end of the stem 38 for rotating the latter, and a bracket 40 is connected to the lower end of the stem 38. A pair of wheels 41 are journaled in the bracket 40, and the wheels 41 travel in or engage the L-shaped bar 30. Thus, by rotating the knob 39, the front of the platform 36 can be raised or lowered so as to insure that the lawn mower is sharpened at the proper angle and to the proper degree.

Extending upwardly from the platform 36 and secured thereto is a standard 42 which has a light bulb 43 connected thereto, and a reflector 44 is arranged above the light bulb 43. A conduit 45 leads from the standard 42 to a plug 46 which may be connected to a suitable source of electrical energy. A conduit 47 leads from the plug 46 to a motor 48 which serves to operate the grinding or sharpening wheel 49. The motor 48 rotates a shaft 50 which has a pair of pulleys 51 and 52 mounted on its ends, and an endless V-belt 53 is trained over the pulley 52 and over a pulley 54 which is connected to the grinding wheel 49. A suitable shield 55 is arranged above the grinding wheel 49 so as to prevent injury to the operator from flying particles or the like.

A handle 56 is secured to the platform 36 in any suitable manner whereby the platform can be pulled from side to side of the machine along the rod 27 and bar 30 so that the entire length of the lawn mower blades can be sharpened. The lawn mower being sharpened is indicated generally by the numeral 57, and the lawn mower includes a handle 58 and is of conventional construction, there being a rotatable reel 59 provided with a plurality of cutting blades 60 which are to be sharpened. As later described in this application a bed knife or stationary blade 61 of the lawn mower 57 can also be sharpened and this operation is shown being performed in Figure 8. For helping to steady the lawn mower during the grinding operations, a counterweight 62 is arranged contiguous to the front of the machine. A cable 63 is connected to the counterweight 62, and a hook 64 is arranged on the upper end of the cable 63 for engagement with the lawn mower to be sharpened.

Depending from the front of the platform 36 is a lug 65 which has an ear 66 adjustably connected thereto by means of a bolt and nut assembly 67, Figure 2. A finger 68 extends forwardly from the member 66, and a guide member 69 is secured to the finger 68. The guide member 69 is adapted to engage the undersurface of the blade 60 being sharpened so as to insure that the parts are maintained in proper aligned relationship during the sharpening operation.

Extending upwardly from the front of the frame and secured thereto is a pair of spaced parallel vertically disposed plates 70 which have extending therebetween a horizontally disposed rectangular shaped bar 71. Suitable bolt and nut assemblies 72 connect the bar 71 to the plate 70, and handles 73 may be provided for loosening and tightening the bolt and nut assemblies 72.

A bracket 74 extends forwardly from the top part of the frame, and the bracket 74 supports a pulley 75 over which is trained the cable 63 which is connected to the counterweight 62.

There is further provided a stop member 78 which is adapted to be engaged by the ground engaging roller 83 of the lawn mower 57 so as to help support the lawn mower while it is being sharpened. The stop member 78 has a support member 79 secured thereto, and arranged in engagement with the support member 79 are bolts 80 and 81. The bolts 80 and 81 extend through a plate 76 which is secured to the bar 71 by a bolt 77, Figure 4. A coil spring 82 is circumposed on the bolt 81 so as to provide a resilient cushion for the stop member 78. This construction permits the stop member 78 to pivot or rock with respect to the plate 76 which is stationary so that a yieldable abutment is provided for the roller 83 of the lawn mower.

Adjustably mounted on the bar 71 is a pair of clamps 84, Figures 5 and 6. Each of the clamps 84 includes a lower section 87 and an upper section 88 which are interconnected by bolts 85 and 86. A transverse bolt member 89 is carried by each of the lower sections 87 of the clamps 84, and the bolt members 89 may be used selectively to support links 90 and 91 which carry a set screw 92. The set screw 92 may be arranged in engagement with the bed knife 61, Figure 8, so as to maintain the bed knife 61 in its proper position to be ground or sharpened.

Extending upwardly from each of the clamps 84 and secured thereto or formed integral with the top section 88 is a vertically disposed arm 93. A brace 94 may extend rearwardly from each of the arms 93 and can be connected to a suitable supporting structure 95, Figure 5. A strap 96 extends transversely with respect to the arm 93 and is secured thereto, and a bolt and nut assembly 98 pivotally connects a web 97 to the strap 96.

Formed integral with the inner surface of the web 97 or secured thereto is a pointed member 99, and the pointed member 99 is adapted to engage the lawn mower being sharpened to hold it in place. A bolt 100 having a pointed inner end is supported by the strap and the bolt 100 is also provided for at times engaging the lawn mower being sharpened to steady the lawn mower or bed knife, and a knob 101 is provided for rotating the bolt 100 so as to permit the machine to be used with lawn mowers of various widths.

From the foregoing it is apparent that a machine has been provided which will accurately and quickly sharpen various types of lawn mowers whether they be the hand type or power operated. In use the lawn mower to be sharpened is clamped as shown in Figures 1 and 2 and then the various adjustments are made to bring the grinding wheel 49 against the edge of the blade 60 to be sharpened. Then, the motor 48 is actuated whereby the grinding wheel 49 will be rotated so that the blade can be sharpened. By turning the cranks 18, the screw members 17 will be rotated so that the grinding wheel 49 can be moved toward and away from the lawn mower being sharpened, and the handle 56 is gripped in order to move the grinding wheel 49 across the entire edge of the blade being sharpened.

The motor 48 can be of conventional construction and the machine is operated by hand and the handle 56 is gripped to easily draw the grinding wheel 49 across the blades of the reel and the cutter bar. The machine grinds all types of hand and power mowers and hand mowers can be ground without removing or disassembling any portion of the mower other than the bed knife. After the bed knife has been ground, the mower is locked onto the machine by means of the members 99 and 100. After the lawn mower is locked and the grinding wheel 49 is brought into alignment, the correct bevel can be obtained by the knob 39 which will raise or lower the grinding wheel up or down. Also, the bolts 23 can be rotated to provide a further adjustment. The machine grinds to and fro on each blade so that the operator draws the grinding wheel to him after reaching the end of the blade and then goes right back across the blade on the return trip for the next blade. After the desired sharpness is obtained the operator may loosen the feed screw slightly and run over each blade again in a very light sparking off operation and then the lawn mower can be removed. Power mowers can be ground in the same manner as hand mowers and it is not necessary to remove the wheels, handles, motors or controls although where open drive chains are used, the drive chains may be removed in order to free-up the reel for precision grinding. Also, the oil band air cleaners on carburetors may be removed to prevent the oil from spilling from the cleaner. A set of light rope blocks may be used to lift power mowers up onto the grinding machine so that one person can handle all power mowers. The machine can be adjusted from the front or back on hand mowers and the front adjusting cranks 18 can be used on power mowers. The rear or back cranks can be used for ease to the operator and add flexibility to the machine. The traveling light 43 mounted on the traversing platform 36 enables the operator to have a light following the grinding wheel at all times and the machine is light in weight and ruggedly constructed. When mowers are sent in without their handle, the weight 62 may be attached to the mower by means of the hook 64 to hold the lawn mower down and act as a stabilizing force. The guard 55 prevents dust from getting on the track of the traversing platform 36. The rollers for supporting the platform 36 may be ball bearing rollers and no special tools are required to adjust the machine. The guide 69 is an important element since the reel blades 60 rest on this tongue or guide, the guide being made of an extremely hard material. This guide 69 serves to hold the mower reel blades in perfect alignment during grinding and also permits the operator to grind coming and going which provides a time saving feature. The pulley 51 can be used for turning the emery wheel 49 by hand to insure a perfect setting by evenness of pressure produced by the sense of feel in the turning of this wheel.

What is claimed is:

1. A lawn mower grinding machine comprising a frame including a pair of spaced parallel vertically disposed front legs, a pair of spaced parallel vertically disposed rear legs, crosspieces connecting the tops of said front legs together and the tops of said rear legs together, horizontally disposed spaced parallel side members interconnecting said front and rear legs together, a vertically disposed plate extending upwardly from the front end of each of said side members and secured thereto, lugs depending from said crosspieces, a pair of horizontally disposed spaced parallel screw members extending between said crosspieces and rotatably supported by said lugs, manually operable cranks for rotating said screw members, a plurality of spaced parallel vertically disposed posts extending upwardly from said side members and secured thereto, a first pair of horizontally disposed spaced parallel L-shaped angle irons secured to said posts, a second pair of spaced parallel horizontally disposed angle irons supported above said first angle irons, adjustable rods extending through said second angle irons and engaging said first angle irons, clamps interconnecting said first and second angle irons together, a horizontally disposed cylindrical rod supported by said second angle irons, an L-shaped bar supported by said second angle irons and arranged in spaced parallel relation in front of said cylindrical rod, braces interconnecting said L-shaped bar and cylindrical rod together, a platform mounted for movement along said cylindrical rod and L-shaped bar, wheels connected to said platform and engaging said rod and L-shaped bar, a motor supported on said platform and adapted to be connected to a source of electrical energy, a grinding wheel rotatably supported by said platform in front of said motor, belt and pulley means connecting said motor to said grinding wheel, a guide member mounted contiguous to said grinding wheel for engagement with the lawn mower being sharpened, and adjustable arms arranged in engagement with said screw members and connected to said L-shaped bar, means for supporting the lawn mower being sharpened, manually operable means for adjusting the elevation of said platform, and a cable having a hook adapted to be connected to the lawn mower, and a counterweight on the lower end of said cable for stabilizing the lawn mower during the sharpening thereof.

2. The apparatus as described in claim 1, and further including a handle connected to said platform for moving said platform along said cylindrical rod and L-shaped bar.

3. In a lawn mower grinding machine, a frame including a pair of spaced parallel vertically disposed front legs, a pair of spaced parallel vertically disposed rear legs, crosspieces connecting the tops of said front legs together and the tops of said rear legs together, horizontally disposed spaced parallel side members interconnecting said front and rear legs together, a vertically disposed plate extending upwardly from the front end of each of said side members and secured thereto, lugs depending from said crosspieces, a pair of horizontally disposed spaced parallel screw members extending between said crosspieces and rotatably supported by said lugs, manually operable cranks for rotating said screw members, a plurality of spaced parallel vertically disposed posts extending upwardly from said side members and secured thereto, a first pair of horizontally disposed spaced parallel L-shaped angle irons secured to said posts, a second pair of spaced parallel horizontally disposed angle irons supported above said first angle irons, adjustable rods extending through said second angle irons and engaging said first angle irons, clamps interconnecting said first and second angle irons together, a horizontally disposed cylindrical rod supported by said second angle irons, an L-shaped bar supported by said second angle irons and arranged in spaced parallel relation in front of said cylindrical rod, a pair of blocks depending from said L-shaped bar and secured to said second angle irons, braces interconnecting said L-shaped bar and cylindrical rod together, a platform mounted for movement along said cylindrical rod and L-shaped bar, an elongated stem having a threaded portion engaging said platform, a knob for adjusting said stem, wheels connected to said stem and engaging said rod and L-shaped bar, a motor supported on said platform and adapted to be connected to a source of electrical energy, a grinding wheel rotatably supported by said platform in front of said motor, belt and pulley means connecting said motor to said grinding wheel, a guide member mounted contiguous to said grinding wheel for engagement with the lawn mower being sharpened, and adjustable arms arranged in engagement with said screw members and connected to said blocks, means for supporting the lawn mower being sharpened, a cable having a hook adapted to be connected to the lawn mower, and a counterweight on the lower end of said cable for stabilizing the lawn mower during the sharpening thereof, a handle connected to said platform for moving said platform along said cylindrical rod and L-shaped bar, a pivotally mounted stop member arranged adjacent the upper front portion of said frame for engaging the ground engaging roller of the lawn mower being sharpened, a support member secured to said stop member, and coil spring means connected to said support member for permitting rocking movement of said stop member.

References Cited in the file of this patent

UNITED STATES PATENTS

| | | |
|---|---|---|
| 556,868 | Schureman | Mar. 24, 1896 |
| 1,967,118 | Glasgow | July 17, 1934 |
| 2,149,774 | Ingleman | Mar. 7, 1939 |
| 2,187,289 | Utterback | Jan. 16, 1940 |
| 2,279,798 | Shelburne | Apr. 14, 1942 |
| 2,286,970 | Maynard | June 16, 1942 |
| 2,377,126 | Brown | May 29, 1945 |
| 2,466,905 | Machovec | Apr. 12, 1949 |
| 2,493,619 | Comstock | Jan. 3, 1950 |